United States Patent
Younes et al.

(10) Patent No.: US 11,479,151 B2
(45) Date of Patent: Oct. 25, 2022

(54) MOTOR VEHICLE SEAT PROVIDED WITH AN INTERFACE FOR CONTROLLING A MOVEMENT OF A SEAT HINGE

(71) Applicant: FAURECIA Sièges d'Automobile, Nanterre (FR)

(72) Inventors: Mustapha Younes, Villeneuve la Garenne (FR); Sébastien Seille, Briis sous Forges (FR); Erick-Pascal Levernieux, Aubigny sur Nere (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/317,117

(22) Filed: May 11, 2021

(65) Prior Publication Data

US 2021/0354600 A1    Nov. 18, 2021

(30) Foreign Application Priority Data

May 12, 2020  (FR) ..................................... 20 04666

(51) Int. Cl.
    *B60N 2/225*    (2006.01)
    *B60N 2/22*     (2006.01)

(52) U.S. Cl.
    CPC ......... *B60N 2/2254* (2013.01); *B60N 2/2213* (2013.01); *B60N 2205/40* (2013.01)

(58) Field of Classification Search
    CPC . B60N 2/2213; B60N 2/2227; B60N 2205/40
    See application file for complete search history.

(56) References Cited

U.S. PATENT DOCUMENTS

| | | | |
|---|---|---|---|
| 6,024,406 A | 2/2000 | Charras | |
| 8,708,409 B2 | 4/2014 | Nitsuma | |
| 8,757,722 B2 | 6/2014 | Gupte | |
| 8,777,308 B2 | 7/2014 | Lee | |
| 2004/0108765 A1 | 6/2004 | Habedank | |

(Continued)

FOREIGN PATENT DOCUMENTS

| | | | | |
|---|---|---|---|---|
| CN | 109228973 A | | 1/2019 | |
| CN | 113844343 A | * | 12/2021 | ............... B60N 2/23 |

(Continued)

OTHER PUBLICATIONS

French Preliminary Search Report for French App. No. 2004666 dated Dec. 7, 2020, BET210055 FR, 7 pages, No English Translation available.

*Primary Examiner* — Timothy J Brindley
(74) *Attorney, Agent, or Firm* — Barnes & Thornburg LLP

(57) ABSTRACT

A seat for a motor vehicle, the seat comprising a backrest and a seating portion, the backrest being mounted to rotate relative to the seating portion about a substantially transverse axis, a hinge being provided for adjusting a tilt of the backrest relative to the seating portion about the substantially transverse axis, the seat being provided with a plurality of means for controlling a movement of the hinge, the seat further comprising an interface for controlling said movement of the hinge, the interface comprising a central portion and a peripheral portion, the peripheral portion being arranged around the central portion, the interface further comprising a plurality of recesses shaped to receive the plurality of means for controlling the movement of said hinge.

16 Claims, 6 Drawing Sheets

(56) References Cited

U.S. PATENT DOCUMENTS

Figure 1:
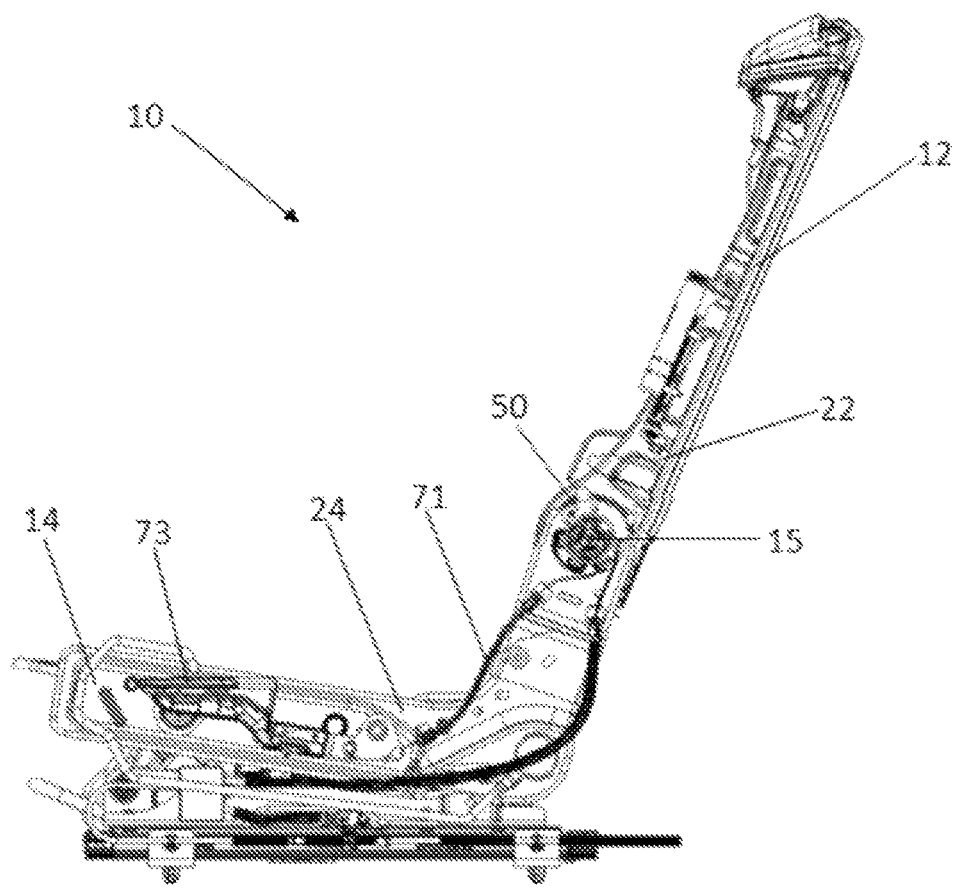

| | | | |
|---|---|---|---|
| 2009/0108655 A1* | 4/2009 | Yokoyama | B60N 2/20 |
| | | | 297/344.11 |
| 2009/0167066 A1 | 7/2009 | Mori | |
| 2019/0016238 A1 | 1/2019 | Denis | |
| 2020/0238862 A1 | 7/2020 | Szlag | |
| 2021/0061139 A1* | 3/2021 | Schmitz | B60N 2/236 |

FOREIGN PATENT DOCUMENTS

| | | | | |
|---|---|---|---|---|
| DE | 10310424 A1 * | 9/2004 | | B60N 2/12 |
| DE | 102004032396 A1 * | 2/2006 | | B60N 2/22 |
| DE | 102004032396 A1 | 2/2006 | | |
| KR | 100863115 B1 * | 10/2008 | | |
| WO | 9854024 A1 | 12/1998 | | |
| WO | WO-2015010819 A1 * | 1/2015 | | B60N 2/08 |
| WO | WO-2015113784 A1 * | 8/2015 | | B60N 2/20 |
| WO | WO-2017012847 A1 * | 1/2017 | | B60N 2/20 |
| WO | 2019072847 A1 | 4/2019 | | |

* cited by examiner

MOTOR VEHICLE SEAT PROVIDED WITH AN INTERFACE FOR CONTROLLING A MOVEMENT OF A SEAT HINGE

PRIORITY CLAIM

This application claims priority to French Patent Application No. FR 20 04666, filed May 12, 2020, which is expressly incorporated by reference herein.

BACKGROUND

The present disclosure relates to a seat for a motor vehicle provided with an interface for controlling a movement of a hinge of the seat.

SUMMARY

According to the present disclosure, a motor vehicle seat comprises a backrest and a seating portion, the backrest being mounted to rotate relative to the seating portion about a substantially transverse axis, a hinge being provided for adjusting a tilt of the backrest relative to the seating portion about the substantially transverse axis, the seat being provided with a plurality of means for controlling a movement of the hinge, the seat further comprising an interface for controlling said movement of the hinge, the interface comprising a central portion and a peripheral portion, the peripheral portion being arranged around the central portion, the interface further comprising a plurality of recesses shaped to receive the plurality of means for controlling the movement of said hinge.

The plurality of recesses of the interface makes it possible to connect several means for controlling the movement to the hinge via a single control interface, so as to limit the number of parts to design and install in the seat.

Also, the plurality of recesses allows the control interface to be suitable for installation on seats having different control means, thus avoiding the need to design a new control interface for each seat.

In illustrative embodiments, the control interface has one or more of the following features, alone or in combination:
the plurality of recesses of the interface is arranged on at least one of said central portion and said peripheral portion of the interface;
the central portion and the peripheral portion of the interface are symmetrical with respect to a plane called the plane of symmetry;
the plurality of recesses is arranged symmetrically with respect to said plane of symmetry;
the central portion of the interface is completely or partially surrounded by the peripheral portion of the interface;
the central portion of the interface has a substantially annular cross-section;
the central portion of the interface comprises a central hole shaped to receive an end of a shaft of the hinge;
the peripheral portion has a substantially semi-annular cross-section;
the thickness of the central portion of the interface is greater than the thickness of the peripheral portion, forming a free edge of the central portion; and
the plurality of means for controlling the movement of the hinge comprises at least one among:
a handle installed on the seat, said handle being connected to a first cable received in a first recess of the plurality of recesses, the first cable being adapted to be tensioned by said handle so as to cause movement of the hinge; and
a control installed in a trunk of the motor vehicle, said control being connected to a second cable received in a second recess of the plurality of recesses, the second cable being adapted to be tensioned by said control so as to cause movement of the hinge; and
a first strap received on a third recess of the plurality of recesses, the strap winding around the free edge of the central portion when force is applied to the strap, so as to create a torque causing movement of the hinge in a first direction; and
a second strap received on a fourth recess of the plurality of recesses, the strap winding around said free edge when force is applied to the strap, so as to create a torque causing movement of the hinge in a second direction substantially opposite to said first direction; and
a handle mounted on the interface so as to rotate about the substantially transverse axis.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
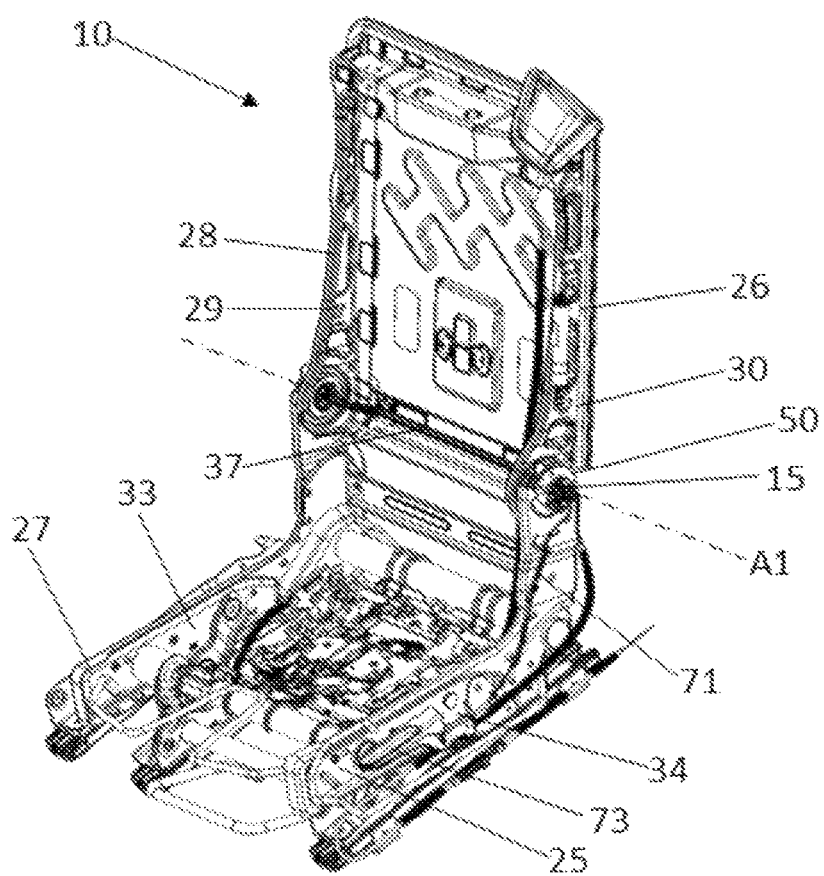
Figure 3:
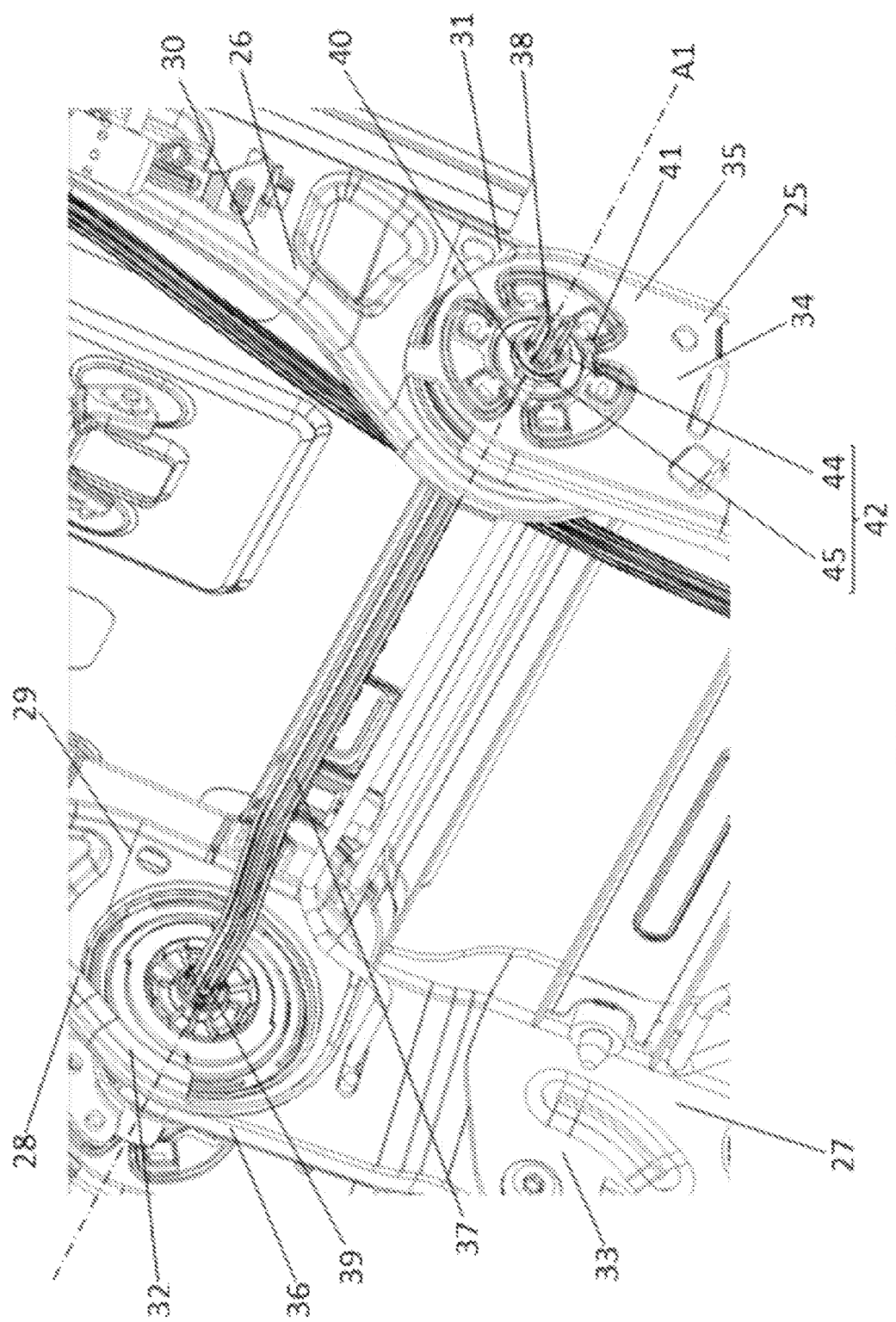
Figure 4:
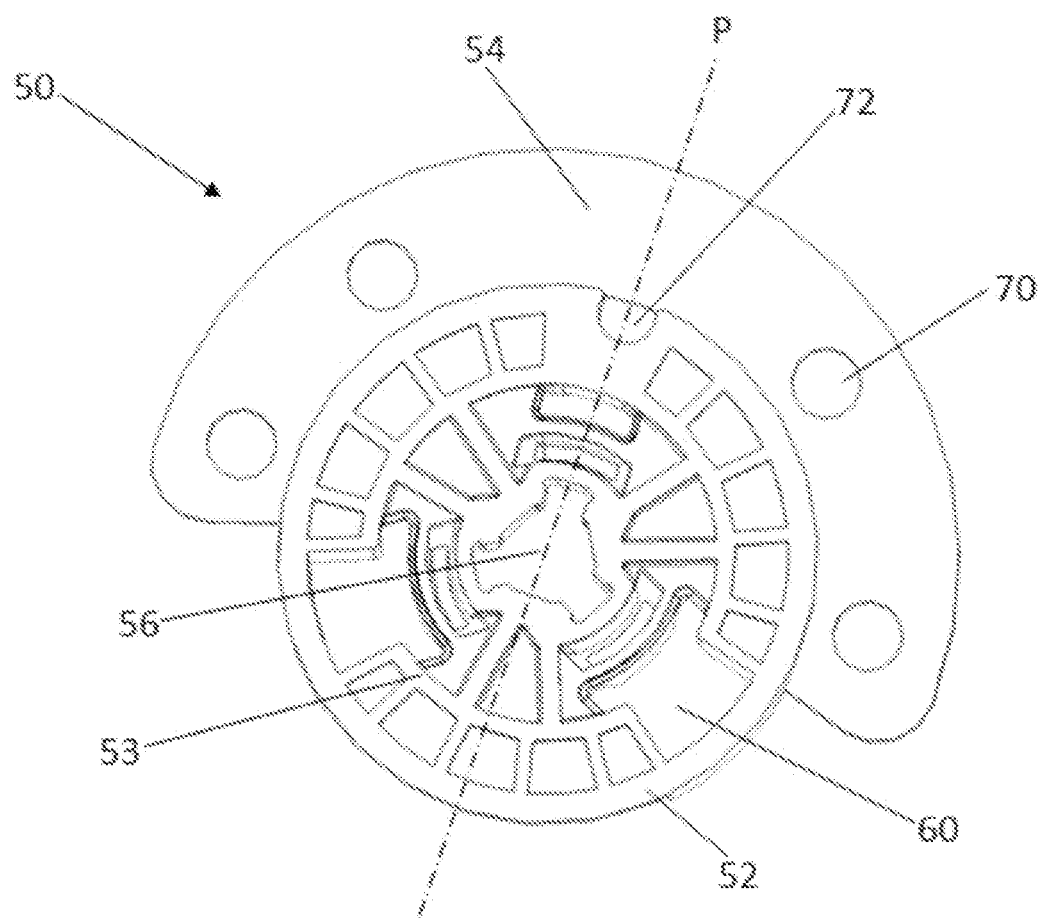
Figure 5:
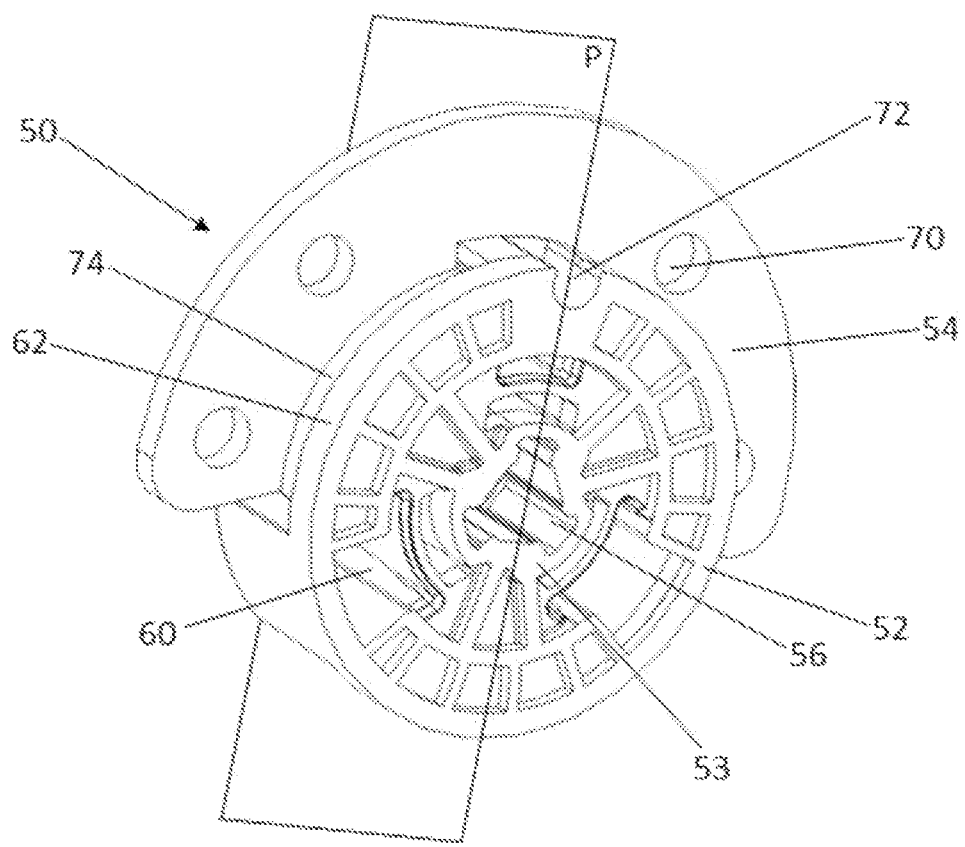
Figure 6:
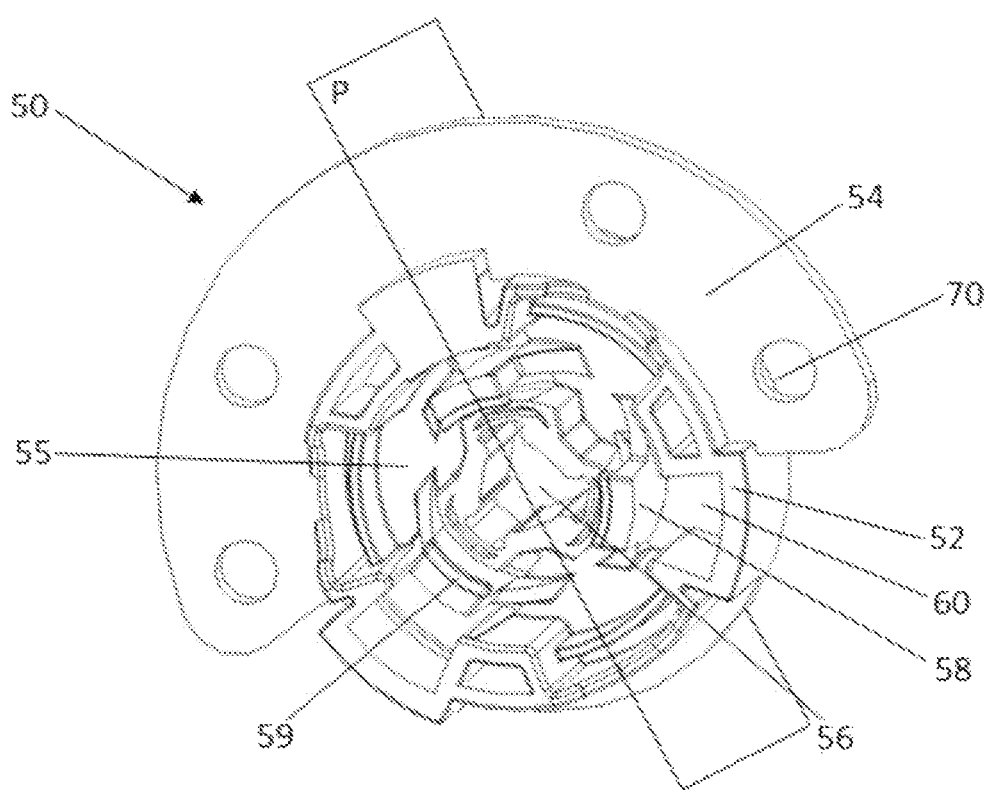

The detailed description particularly refers to the accompanying figures in which:
FIG. 1 shows a schematic side view of a motor vehicle seat;
FIG. 2 shows a schematic perspective view of the seat of FIG. 1;
FIG. 3 shows a schematic perspective view of a first detail view of the seat of FIG. 1;
FIG. 4 shows a schematic side view of an interface for controlling a movement of a hinge of the seat of FIG. 1;
FIG. 5 shows a schematic perspective view of a first face of the interface for controlling the movement of the hinge of FIG. 4; and
FIG. 6 shows a schematic perspective view of a second face of the interface for controlling the movement of the hinge of FIG. 4.

DETAILED DESCRIPTION

In the various figures, the same references designate identical or similar elements.

In the following description, the indications of spatial positioning such as top, bottom, upper, lower, horizontal, vertical, etc. are given for clarity of the description, according to the usual position of use of the seat, but are not limiting. In particular, the orientations relating to the front and rear of the seat are relative to the usual position of use of the seat.

Longitudinal direction is understood to mean any direction extending between the front and rear of the vehicle seat. Transverse direction is understood to mean any direction extending from one side of the vehicle seat to the other side of the vehicle seat. For example, the longitudinal and transverse directions are substantially horizontal. Vertical direction is understood to mean any direction perpendicular to the longitudinal and transverse directions.

FIG. 1 shows a schematic side view of a seat 10 for a motor vehicle. The seat 10 comprises a backrest 12, a seating portion 14, and a hinge 15.

The backrest 12 comprises a backrest frame 22. The seating portion 14 comprises a seating portion frame 24. The backrest 12 is mounted to rotate relative to the seating portion 14 about a substantially transverse axis A1. The hinge 15 will be described in more detail with reference to FIG. 2.

The seat 10 is intended to be connected to a floor of the vehicle.

As is clearly illustrated in FIG. 2, the backrest frame 22 comprises a first lateral side 26 and a second lateral side 28. The lateral sides 26, 28 each comprise an inner face 29 and an outer face 30.

The first and second lateral sides 26, 28 extend substantially in the vertical direction.

A lower end 31 of the first lateral side 26 comprises a first hole (not visible). The first hole passes through the first lateral side 26 from the inner face 29 to the outer face 30. Similarly, a lower end 32 of the second lateral side 28 comprises a second hole (not visible). The second hole passes through the second lateral side 28 from the inner face 29 to the outer face 30. For example, the shape and dimension of the first hole and second hole are equal. For example, the first hole and second hole are coaxial.

The seating portion frame 24 comprises a first lateral side 25 and a second lateral side 27. The lateral sides 25, 27 each comprise an inner face 33 and an outer face 34.

The first and second lateral sides 25, 27 each substantially have an L-shape, with a first portion and a second portion. The first portion extends substantially in the longitudinal direction. The second portion extends substantially in the vertical direction.

An upper end 35 of the second portion of the first lateral side 25 comprises a third hole (not visible). The third hole passes through the first lateral side 25 from the inner face 33 to the outer face 34. An upper end 36 of the second portion of the second lateral side 27 comprises a fourth hole (not visible). The fourth hole passes through the second lateral side 27 from the inner face 33 to the outer face 34. For example, the shape and size of the third hole and fourth hole are equal. For example, the third hole and fourth hole are coaxial.

At least one projection 41 extends substantially in the transverse direction from outer face 34 of first lateral side 25 and/or of second lateral side 27. In particular, the at least one projection 41 is arranged near the third hole and/or fourth hole on upper end 35 and/or on upper end 36. For example, at least two projections 41 extend in the transverse direction from outer face 34 of first lateral side 25 and/or of second lateral side 27.

The upper ends 35, 36 of lateral sides 25, 27 are configured to engage, respectively, with lower end 31 and lower end 32 of lateral sides 26, 28. For example, inner face 33 of lateral sides 25, 27 of the seating portion frame 24 engage with outer face 30 of lateral sides 26, 28 of the backrest frame 22. Alternatively, outer face 34 of lateral sides 25, 27 of the seating portion frame 24 engages with inner face 29 of lateral sides 26, 28 of the backrest frame 22. In this alternative, the at least one projection 41 is arranged near the first hole and/or third hole and extends along the transverse direction from lower end 31 and/or from lower end 32 of the backrest frame 22.

For example, when the upper ends 35, 36 engage with the lower ends 31, 32, the first hole faces the third hole, and the second hole faces the fourth hole.

The hinge 15 of the seat 10 will now be described in more detail.

The hinge 15 comprises a shaft 37 extending in the transverse direction between a first end 38 and a second end 39.

The first end 38 is shaped to be inserted into the first and third holes, and the second end 39 is shaped to be inserted into the second and fourth holes. Thus, the shaft 37 passes through the seat 10 in the transverse direction. For example, the shape and dimension of the first end 38 and second end 39 are equal.

The end 38 protrudes in the transverse direction from the outer face 34 of first lateral side 25. The end 39 protrudes in the transverse direction from the outer face 34 of second lateral side 27.

The hinge 15 further comprises at least one part 40 for holding the shaft 37 in position. For example, the hinge 15 comprises a first part 40 and a second part 40.

Each part 40, for example, comprises a first portion (not shown) and a second portion 42. The first portion and second portion 42 have a substantially cylindrical shape. For example, the cross-section of the first portion is less than the cross-section of the second portion 42. The second portion 42 comprises an outer surface 44 provided with a hollow 45.

The first portion of the first part 40 is shaped to be inserted into the first and third holes. The first portion of the second part 40 is shaped to be inserted into the second and fourth holes. When the first portion of each part 40 is inserted into the first and third holes or into the second and fourth holes, the second portion 42 of the first and second parts 40 is shaped to abut against the outer faces 34 of first lateral side 25 and second lateral side 27 respectively.

Thus, the second portion 42 of the first part 40 protrudes in the transverse direction from the outer face 34 of first lateral side 25. Similarly, the second portion 42 of the second part 40 protrudes substantially in the transverse direction from the outer face 34 of second lateral side 27.

Each part 40 is traversed in the transverse direction by a hole (not visible). The hole is shaped to partially receive end 38 and/or end 39 of the shaft 37. In particular, a tip of end 38 and/or end 39 projects substantially transversely from the first part 40 and the second part 40 respectively.

The size and shape of the hole 44 are chosen so that end 38 is tightly mounted in the first part 40 and end 39 is tightly mounted in the second part 40. The shaft 37 is thus prevented from moving in the transverse direction when the shaft 37 is installed in the seat 10.

The first and second parts 40 are configured to rotate about axis A1 in response to an applied mechanical force, so as to drive the shaft 37 to rotate about axis A1. The rotation of the shaft 37 about axis A1 causes rotation of the backrest frame 22 relative to the seating portion frame 24 about axis A1.

The hinge 15 thus makes it possible to adjust a tilt of the backrest 12 relative to the seating portion 14 about axis A1. More precisely, movement of the hinge 15 allows adjusting the tilt of the backrest 12 relative to the seating portion 14. For example, the hinge 15 is a discontinuous type of hinge, allowing adjustment of the tilt of the backrest 12 relative to the seating portion 14 within a range of discrete values of angles. Alternatively, the hinge 15 is a continuous type of hinge.

As is shown in particular in FIGS. 2 and 3, the seat 10 further comprises an interface 50 for controlling the movement of the hinge 15 and a plurality of means for controlling said movement of the hinge 15. The interface 50 is installed on lateral side 25 or on lateral side 27 of the seating portion frame 24. Alternatively, the seat 10 comprises a first interface 50 installed on lateral side 25 and a second interface 50 installed on lateral side 27.

The interface 50 will now be described, with reference to FIGS. 4 to 6.

The interface 50 comprises a central portion 52 and a peripheral portion 54. The central 52 and peripheral 54 portions are interconnected. In particular, the peripheral portion 54 is arranged around the central portion 52.

The central portion 52 has a substantially annular cross-section, comprising a central hole 56. The central hole 56 is shaped to receive end 38 and/or end 39 of the shaft 37. In particular, the shape and dimension of the central hole is substantially equal to the shape and dimension of end 38 and/or of end 39.

The central portion 52 has a front face 53, illustrated in FIGS. 4 and 5, and a rear face 55, illustrated in FIG. 6.

The rear face 55 of the central portion 52 comprises a set of tabs 58. The set of tabs 58 is arranged around the central hole 56. Each tab 58 extends substantially parallel to the central hole 56. For example, the length of each tab 58 is greater than the length of the central hole 56.

One end of each tab 58 comprises a relief 59 projecting in a direction substantially perpendicular to the direction in which each tab 58 extends. The relief 59 is in particular shaped to fit into the hollow 45 of the second portion 42 of one of the parts 40. The interface 50 is thus connected to the seat 10. The relief 59 makes it possible in particular to connect the interface 50 to the seat 10 by snapping the interface 50 onto the part 40.

As the length of each tab 58 is greater than the length of the central hole 56, the central hole 56 is placed in front of the hole of the part 40 when the end 59 of each tab 58 is introduced into the hollow 45 of one of the parts 40. The tip of end 38 and/or the tip of end 39 of the shaft 37, projecting from one of the parts 40, can therefore be inserted into the central hole 56.

The central portion 52 further comprises at least one peripheral hole 60. For example, the central portion 52 comprises at least as many peripheral holes 60 as there are projections 41 arranged on the lateral side 25, 27 on which the interface 50 is installed. Each peripheral hole 60 is shaped to accommodate a projection 41 when the interface 50 is connected to the seat 10. More precisely, the shape and dimension of each peripheral hole 60 is chosen so that the interface 50 can make a rotation about axis A1 before the peripheral hole abuts against the projection 41.

As can be seen from the figures, the rotation of the interface 50 about axis A1 takes place over an angular range of between 0° and 90°, for example, between 0° and 60°, for example, between 0° and 45°.

The peripheral portion 54 completely or partially surrounds the central portion 52. In the current case, the peripheral portion 54 has a substantially semi-annular cross-section.

The thickness of the peripheral portion 54 is less than the thickness of the central portion 52, so as to form a free edge 62 of the central portion 52.

In one example, the central portion 52 and the peripheral portion 54 of the interface are symmetrical with respect to a plane P, called the plane of symmetry P. The plane of symmetry P is substantially perpendicular to the central portion 52 and to the peripheral portion 54.

Since the interface 50 is snapped onto the part 40, the rotation of the interface 50 about axis A1 causes rotation of the part 40 about axis A1. Thus, the rotation of the interface about axis A1 induces rotation of the shaft 37, and consequently the movement of the hinge about axis A1. The tilt of the backrest 12 relative to the seating portion 14 is thus modified.

In one example, the interface 50 is made of a polymer material, but any other suitable type of material could be considered.

The interface 50 further comprises a plurality of recesses shaped to receive the plurality of means for controlling the movement of said hinge 15. The plurality of recesses of the interface 50 is arranged on said central portion 52 and/or on said peripheral portion 54 of the interface 50.

As can clearly be seen in FIGS. 4 and 5, the plurality of recesses of the interface comprises at least one among:
at least one hole 70 passing through the peripheral portion 54 of the interface 50; and/or
at least one blind cavity 72 arranged on the free edge 62 of the central portion 52 of the interface 50; and/or
at least one groove 74 extending over all or part of the free edge 62 of the central portion 52 of the interface 50.

Each hole 70 is able to receive a cable 71 adapted to be tensioned and connected to a means for controlling the movement of the hinge 15. For example, the cable is a Bowden cable or a traction cable. As shown in FIGS. 1 and 2, the cable 71 is connected for example to a handle 73 installed on the seat 10. Additionally or alternatively, the cable 71 is connected to a control (not shown) installed in a trunk of the vehicle. When force is applied to the handle 73 or to the control in the trunk, the cable 71 associated with the handle 73 or with the control in the trunk is tensioned, which causes rotation of the interface 50 about axis A1. The shaft 37 of the hinge 15 is thus rotated so as to modify the tilt of the backrest 12 relative to the seating portion 14.

The at least one blind cavity 72 is able to receive a strap (not illustrated). The strap is configured to wind around the free edge 62 of the central portion 52 when the strap is tensioned. A torque is thus created. The torque causes rotation of the interface 50 about axis A1, causing rotation of the shaft 37 of the hinge 15. The tilt of the backrest 12 relative to the seating portion 14 is thus modified.

In the figures, the interface 50 comprises a single blind cavity 72 which makes it possible to install a single strap causing movement of the hinge in one direction. Alternatively, the interface 50 could include two substantially opposite blind cavities 72. Thus, a first strap and a second strap can be installed on the interface 50. The first strap causes the shaft 37 to rotate in a first direction, while the second strap causes the shaft 37 to rotate in a second direction substantially opposite to the first direction. Thus, the tilt of the backrest 12 relative to the seating portion 14 can be changed in the first direction and in the second direction.

The at least one groove 74 is able to receive a handle (not illustrated) mounted to rotate on the interface 50 about axis A1. The handle, for example, comprises tabs shaped to fit into the groove 74. The handle is thus installed on the interface 50 by snap-fitting. The rotation of the handle about axis A1 causes rotation of the interface 50, and therefore rotation of the shaft 37 of the hinge 15, about axis A1. For example, the handle is made of a polymer material.

For example, the plurality of recesses is arranged symmetrically with respect to the plane of symmetry P. The interface 50 thus is equally capable of being installed on a right side or on a left side of the seat 10, without the need to make two different interfaces 50 according to the side to which the interface 50 is connected.

One will also note that since the interface 50 is assembled onto the seat simply by plastic snap-fitting, replacement of said interface 50 is facilitated.

This disclosure is not limited to the example described above with reference to the figures. This disclosure also encompasses all variants and combinations that a person skilled in the art can conceive of within the framework of the protection sought.

In the automotive field in particular, a comparative vehicle seat is provided with a backrest and a seating portion. Generally, the backrest can be tilted relative to the seating portion by means of a hinge provided in the seat. In particular, the movement of the hinge makes it possible to adjust the tilt of the backrest relative to the seating portion.

In the comparative vehicle seat, the movement of the hinge is triggered manually by actuation of a means for controlling the movement of the hinge, such as a handle. The means for controlling the movement is connected to the hinge via an interface for controlling the movement of the hinge.

It may be possible for the movement of the comparative hinge to be controlled by means for controlling the movement of the hinge, placed at different positions in the seat and/or in the vehicle. Thus, for example, the movement of the hinge can be triggered by actuation of a means for controlling the movement of the hinge arranged directly on the seat, and by a control means arranged in the trunk of the vehicle.

The presence of several means for controlling the movement of the comparative hinge implies the installation, in the seat, of several interfaces for controlling the movement, each control interface being adapted to one control means. Thus, for each means for controlling the movement that is intended to be connected to the hinge, a specific interface for controlling the movement must be designed and installed in the seat. Manufacture of the comparative seat therefore becomes long and expensive.

The present disclosure is intended to improve over the comparative seat.

To this end, a seat for a motor vehicle is described, the seat comprising a backrest and a seating portion, the backrest being mounted to rotate relative to the seating portion about a substantially transverse axis, a hinge being provided for adjusting a tilt of the backrest relative to the seating portion about the substantially transverse axis, the seat being provided with a plurality of means for controlling a movement of the hinge, the seat further comprising an interface for controlling said movement of the hinge, the interface comprising a central portion and a peripheral portion, the peripheral portion being arranged around the central portion, the interface further comprising a plurality of recesses shaped to receive the plurality of means for controlling the movement of said hinge.

Thus, for example, the plurality of recesses of the interface makes it possible to connect several means for controlling the movement to the hinge via a single control interface, so as to limit the number of parts to design and install in the seat.

Also, the plurality of recesses allows the control interface to be suitable for installation on seats having different control means, thus avoiding the need to design a new control interface for each seat.

According to one example, the control interface has one or more of the following features, alone or in combination:
the plurality of recesses of the interface is arranged on at least one of said central portion and said peripheral portion of the interface;
the central portion and the peripheral portion of the interface are symmetrical with respect to a plane called the plane of symmetry;
the plurality of recesses is arranged symmetrically with respect to said plane of symmetry;
the central portion of the interface is completely or partially surrounded by the peripheral portion of the interface;
the central portion of the interface has a substantially annular cross-section;
the central portion of the interface comprises a central hole shaped to receive an end of a shaft of the hinge;
the peripheral portion has a substantially semi-annular cross-section;
the thickness of the central portion of the interface is greater than the thickness of the peripheral portion, forming a free edge of the central portion; and
the plurality of means for controlling the movement of the hinge comprises at least one among:
a handle installed on the seat, said handle being connected to a first cable received in a first recess of the plurality of recesses, the first cable being adapted to be tensioned by said handle so as to cause movement of the hinge; and
control installed in a trunk of the motor vehicle, said control being connected to a second cable received in a second recess of the plurality of recesses, the second cable being adapted to be tensioned by said control so as to cause movement of the hinge; and
first strap received on a third recess of the plurality of recesses, the strap winding around the free edge of the central portion when force is applied to the strap, so as to create a torque causing movement of the hinge in a first direction; and
a second strap received on a fourth recess of the plurality of recesses, the strap winding around said free edge when force is applied to the strap, so as to create a torque causing movement of the hinge in a second direction substantially opposite to said first direction; and
a handle mounted on the interface so as to rotate about the substantially transverse axis.

The invention claimed is:

1. A seat for a motor vehicle, the seat comprising
a backrest and a seating portion, the backrest being mounted to rotate relative to the seating portion about a substantially transverse axis, a hinge being provided for adjusting a tilt of the backrest relative to the seating portion about the substantially transverse axis, the seat being provided with a plurality of means for controlling a movement of the hinge, the seat further comprising an interface for controlling said movement of the hinge, the interface comprising a central portion and a peripheral portion, the peripheral portion being arranged around the central portion, the interface further comprising a plurality of recesses shaped to receive the plurality of means for controlling the movement of said hinge.

2. The seat of claim 1, wherein the plurality of recesses of the interface is arranged on at least one of said central portion and said peripheral portion of the interface.

3. The seat of claim 1, wherein the central portion and the peripheral portion of the interface are symmetrical with respect to a plane called the plane of symmetry.

4. The seat of claim 3, wherein the plurality of recesses is arranged symmetrically with respect to said plane of symmetry.

5. The seat of claim 1, wherein the central portion of the interface is completely or partially surrounded by the peripheral portion of the interface.

6. The seat of claim 1, wherein the peripheral portion has a substantially semi-annular cross-section.

7. The seat of claim 1, wherein the central portion of the interface has a substantially annular cross-section.

8. The seat of claim 1, wherein the central portion of the interface comprises a central hole shaped to receive an end of a shaft of the hinge.

9. The seat of claim 1, wherein the thickness of the central portion of the interface is greater than the thickness of the peripheral portion, forming a free edge of the central portion.

10. The seat of claim 9, wherein the plurality of means for controlling the movement of the hinge comprises at least one among:
- a handle installed on the seat, said handle being connected to a first cable received in a first recess of the plurality of recesses, the first cable being adapted to be tensioned by said handle so as to cause movement of the hinge; and
- a control installed in a trunk of the motor vehicle, said control being connected to a second cable received in a second recess of the plurality of recesses, the second cable being adapted to be tensioned by said control so as to cause movement of the hinge; and
- a first strap received on a third recess of the plurality of recesses, the strap winding around the free edge of the central portion when force is applied to the strap, so as to create a torque causing movement of the hinge in a first direction; and
- a second strap received on a fourth recess of the plurality of recesses, the strap winding around said free edge when force is applied to the strap, so as to create a torque causing movement of the hinge in a second direction substantially opposite to said first direction; and
- a handle mounted on the interface so as to rotate about the substantially transverse axis.

11. The seat of claim 1, wherein the plurality of means for controlling the movement of the hinge comprises:
- a handle installed on the seat, said handle being connected to a first cable received in a first recess of the plurality of recesses, the first cable being adapted to be tensioned by said handle so as to cause movement of the hinge;
- a control installed in a trunk of the motor vehicle, said control being connected to a second cable received in a second recess of the plurality of recesses, the second cable being adapted to be tensioned by said control so as to cause movement of the hinge; and
- a first strap received on a third recess of the plurality of recesses, the strap winding around the free edge of the central portion when force is applied to the strap, so as to create a torque causing movement of the hinge in a first direction.

12. The seat of claim 11, wherein the plurality of means for controlling the movement of the hinge further comprises a second strap received on a fourth recess of the plurality of recesses, the strap winding around said free edge when force is applied to the strap, so as to create a torque causing movement of the hinge in a second direction substantially opposite to said first direction.

13. The seat of claim 1, wherein the plurality of means for controlling the movement of the hinge comprises:
- a handle mounted on the interface so as to rotate about the substantially transverse axis;
- a control installed in a trunk of the motor vehicle, said control being connected to a second cable received in a first recess of the plurality of recesses, the second cable being adapted to be tensioned by said control so as to cause movement of the hinge; and
- a first strap received on a second recess of the plurality of recesses, the strap winding around the free edge of the central portion when force is applied to the strap, so as to create a torque causing movement of the hinge in a first direction.

14. The seat of claim 13, wherein the plurality of means for controlling the movement of the hinge further comprises a second strap received on a third recess of the plurality of recesses, the strap winding around said free edge when force is applied to the strap, so as to create a torque causing movement of the hinge in a second direction substantially opposite to said first direction.

15. The seat of claim 1, wherein the plurality of means for controlling the movement of the hinge comprises:
- a handle installed on the seat, said handle being connected to a first cable received in a first recess of the plurality of recesses, the first cable being adapted to be tensioned by said handle so as to cause movement of the hinge;
- a first strap received on a second recess of the plurality of recesses, the strap winding around the free edge of the central portion when force is applied to the strap, so as to create a torque causing movement of the hinge in a first direction; and
- a second strap received on a third recess of the plurality of recesses, the strap winding around said free edge when force is applied to the strap, so as to create a torque causing movement of the hinge in a second direction substantially opposite to said first direction.

16. The seat of claim 1, wherein the plurality of means for controlling the movement of the hinge comprises:
- a handle mounted on the interface so as to rotate about the substantially transverse axis;
- a first strap received on a first recess of the plurality of recesses, the strap winding around the free edge of the central portion when force is applied to the strap, so as to create a torque causing movement of the hinge in a first direction; and
- a second strap received on a second recess of the plurality of recesses, the strap winding around said free edge when force is applied to the strap, so as to create a torque causing movement of the hinge in a second direction substantially opposite to said first direction.

* * * * *